United States Patent [19]

Yasuda

[11] Patent Number: 5,083,213
[45] Date of Patent: Jan. 21, 1992

[54] CHROMINANCE SIGNAL PROCESSING CIRCUIT AND VIDEO TAPE RECORDER HAVING FUNCTION OF PROCESSING CHROMINANCE SIGNAL

[75] Inventor: Yuzou Yasuda, Gunma, Japan

[73] Assignee: Sanyo Electric Co., Ltd., Moriguchi, Japan

[21] Appl. No.: 408,332

[22] Filed: Sep. 18, 1989

[30] Foreign Application Priority Data

Sep. 19, 1988 [JP] Japan .................. 63-234126

[51] Int. Cl.[5] .................. H04N 9/79; H04N 9/45
[52] U.S. Cl. .................. 358/326; 358/328; 358/330; 358/11
[58] Field of Search .............. 358/326, 330, 310, 329, 358/324, 320, 327, 328, 11, 40; 360/9.1, 33.1

[56] References Cited

U.S. PATENT DOCUMENTS

| | | | |
|---|---|---|---|
| 4,110,761 | 8/1978 | Watatani | 358/326 |
| 4,724,476 | 2/1988 | Nakagawa et al. | 358/310 |
| 4,754,340 | 6/1988 | Nakagawa et al. | 358/329 |
| 4,860,120 | 8/1989 | Yamashita | 358/328 |

*Primary Examiner*—Roy N. Envall, Jr.
*Assistant Examiner*—Huy Nguyen
*Attorney, Agent, or Firm*—Armstrong, Nikaido, Marmelstein, Kubovcik & Murray

[57] ABSTRACT

A chrominance signal processing circuit of VTR comprises a first frequency converting circuit (3) for converting a frequency of a chrominance signal in a video signal. The frequency converting circuit multiplies an inputted chrominance signal and a four-phase signal from a phase shift circuit (29). On the other hand, a second frequency converting circuit (17) generates a signal of 4n ($f_{SC} \pm 40f_H$) by multiplying an oscillating output of $4f_{SC}$ of a first oscillation circuit and an oscillating output of $160f_H$ which is obtained by dividing into $\frac{1}{2}$ a frequency of an output of $320f_H$ of VCO (26), and only a signal of $4n(f_{SC}+40f_H)$ is extracted by BPF (28) to be applied to the phase shift circuit "n" is an integer for these frequency calculations (29). The phase shift circuit (29) divides a frequency of the signal into $\frac{1}{4}$ and shifts the resulting signal by 90° every one horizontal period. Since an input to a phase shift circuit (29) is $4n(f_{SC}+40f_H)$, a highly precise phase shift circuit can be used.

10 Claims, 7 Drawing Sheets

CHROMINANCE SIGNAL PROCESSING CIRCUIT AND VIDEO TAPE RECORDER HAVING FUNCTION OF PROCESSING CHROMINANCE SIGNAL

BACKGROUND OF THE INVENTION

1. Field of the Invention

The present invention relates generally to chrominance signal processing circuits and video tape recorders (hereinafter, referred to as VTR) having a function of processing a chrominance signal and, more particularly, to an integrated chrominance signal processing circuit for converting a frequency of a chrominance signal in recording and reproducing of a video signal and a VTR comprising such a chrominance signal processing circuit.

2. Description of the Background Art

Conventionally, 2-head helical scanning system has been adopted in a home VTR. In a VTR of such a 2-head helical scanning system, no signal region e.g. a guard band is not provided between tracks in order to achieve high density recording, therefore, in reproducing, a crosstalk occurs from an adjacent track. Crosstalk is removed for example from a chrominance signal among signals recorded on a video tape by utilizing a line correlation.

Figure 3:
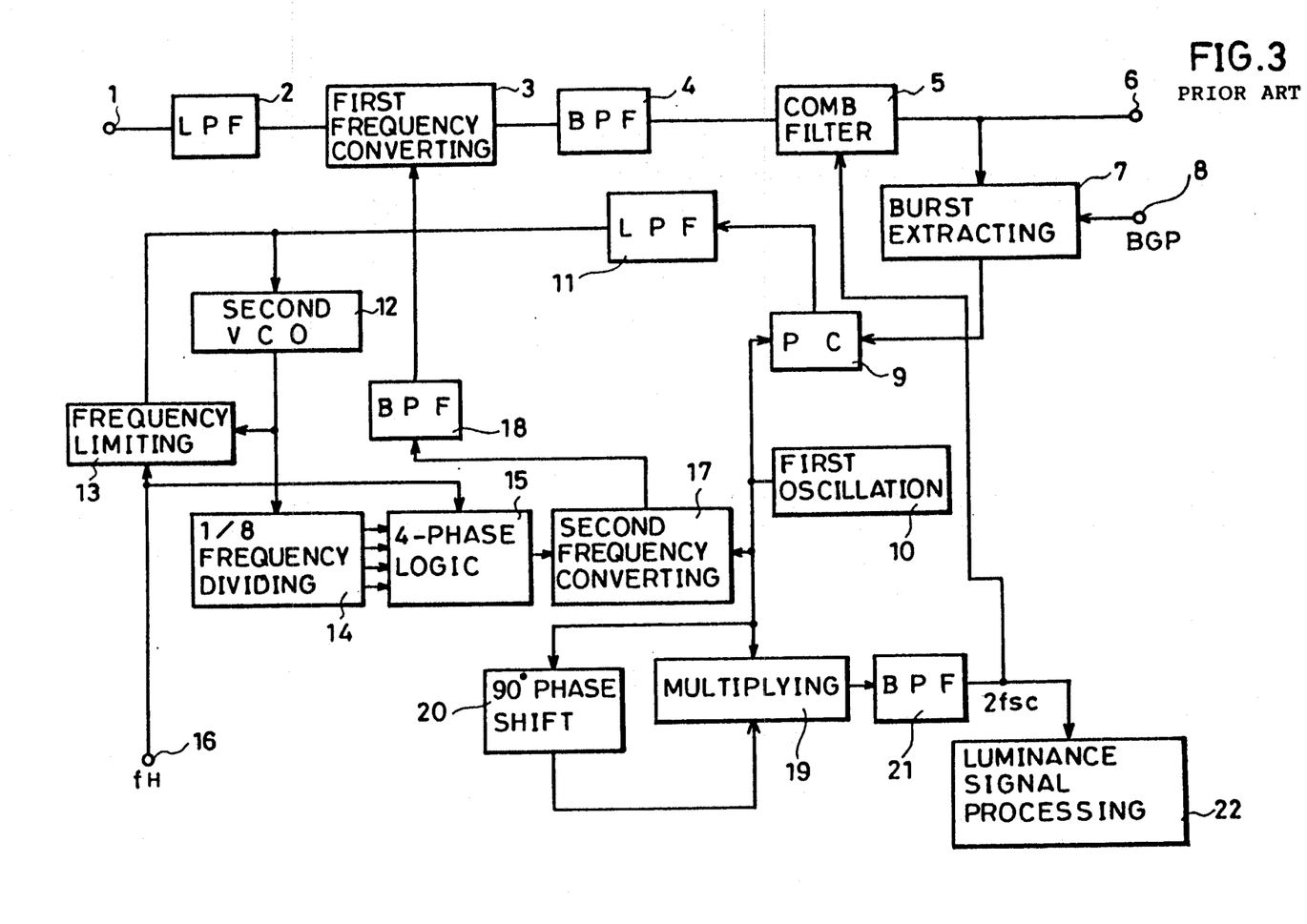
FIG. 3 is a block diagram showing one example of a conventional chrominance signal processing circuit.

FIG. 3 is a circuit diagram showing one example of a chrominance signal processing circuit provided in a reproduction system of a video signal in a conventional VTR, which is in effect implemented as an integrated circuit. The chrominance signal processing circuit converts a low-frequency converted and recorded chrominance signal into a high-frequency signal after being reproduced from a video tape, and removes a crosstalk from the high frequency signal. The example shown in FIG. 3 is for reproducing a video signal of NTSC system.

In FIG. 3, a reproduced video signal from a head (not shown) is applied to an input terminal 1. Only a chrominance signal of 629 KHz of the applied video signal passes through a low-pass filter (LPF) 2 to be inputted to a first frequency converting circuit 3. The first frequency converting circuit 3 causes the chrominance signal of 629 KHz to be converted into a chrominance signal of 4.21 MHz±629 KHz. The frequency converted chrominance signal is supplied to a band-pass filter (BPF) 4 through which only a chrominance signal of 3.58 MHz is extracted. The extracted chrominance signal of 3.58 MHz is applied to a comb filter 5 wherein noise components are removed. Then, the output of the comb filter 5 is supplied to an output terminal 6.

The chrominance signal outputted from the comb filter 5 is applied to a burst extracting circuit 7 at the same time. The burst extracting circuit 7 extracts a burst signal from the chrominance signal in response to a burst gate pulse (BGP) supplied from a terminal 8, thereby applying the burst signal to one input of a phase comparator circuit (PC) 9. On the other hand, an oscillating output signal having a center frequency of 3.58 MHz is applied to the other input of the phase comparator circuit 9 from a first oscillation circuit 10, and the phase comparator circuit 9 compares phases of both of the inputted signals. Then, an error output corresponding to the result is smoothed in a low-pass filter 11 and applied to a second voltage controlled oscillator (VCO) 12.

An output of the VCO 12 is applied to a frequency limiting circuit 13, and when an oscillating frequency of the VCO 12 fluctuates, the frequency limiting circuit 13 generates an error signal corresponding to the fluctuation, thereby feeding back the same to the VCO 12. As a result, a frequency of the oscillating output signal of the VCO 12 is prevented from deviating from a predetermined range, so that oscillation of the VCO 12 is stabilized.

A central frequency of the oscillating output of the VCO 12 is set to $320f_H$ ($f_H$ is a horizontal frequency of 15.734 KHz), and the oscillating output signal is applied to a ⅛ frequency dividing circuit 14, wherein its frequency is frequency-divided into ⅛. The ⅛ frequency dividing circuit generates four frequency-divided signals which are out of phase from each other by 90°. Accordingly, the four signals shifted by 90° and each having a frequency of $40f_H$ are applied to a four-phase logic circuit 15. The four-phase logic circuit 15 selects any of four inputted signals of $40 f_H$ to supply the same, and its selection is switched corresponding to a horizontal synchronizing signal supplied from a terminal 16. More specifically, a signal whose phase is advanced (or delayed) by 90° every 1H (H is one horizontal cycle) is selectively supplied to be applied to a second frequency converting circuit 17. An output of the four-phase logic circuit 15 is multiplied by an oscillating output of 3.58 MHz of the first oscillation circuit 10 by the second frequency converting circuit 17 to be applied to a band-pass filter 18. Then, only a signal having a frequency component of a sum ($40f_H + 3.58$ MHz = 4.21 MHz) of the multiplication result passes through the band-pass filter 18 to be applied to the first frequency converting circuit 3. As a result, in the first frequency converting circuit 3, a chrominance signal of 629 KHz and the above described signal of 4.21 MHz are multiplied, so that its result is applied to the band-pass filter 4. Then, only a signal of 3.58 MHz which is a frequency component of a difference of the multiplication result passes through the band-pass filter 4 to be applied to the comb filter 5.

The comb filter 5 has a 1H delay line using CCD or a glass delay line, and removes crosstalk by subtracting a chrominance signal advanced by 1H and a chrominance signal delayed by 1H to each other. A signal having a frequency of $2f_{SC}$ ($f_{SC}$ is a chrominance subcarrier frequency of 3.58 MHz) is required to drive such a CCD. In the circuit of FIG. 3, such a $2f_{SC}$ signal is obtained by multiplying by double an oscillating output of $f_{SC}$ of the first oscillation circuit 10. More specifically, the oscillating output of the first oscillation circuit 10 is applied to a multiplying circuit 19 directly and through a 90° phase shift circuit 20. Then, only a signal having a frequency of $2f_{SC}$ in multiplication results of the multiplying circuit 19 is extracted by a band-pass filter 21 to be supplied to the comb filter 5. On the other hand, the signal of $2f_{SC}$ is also used for a noise removing circuit (not shown) built in a luminance signal processing circuit 22.

As the foregoing, in the chrominance signal processing circuit shown in FIG. 3, a reproduced chrominance signal of 3.58 MHz can be obtained by inversely converting the low-frequency converted and recorded chrominance signal, and a crosstalk is removed from the reproduced chrominance signal.

A VTR comprising the above described chrominance signal processing circuit is disclosed in Japanese Patent Laying Open No. 62-104296.

Figure 4:
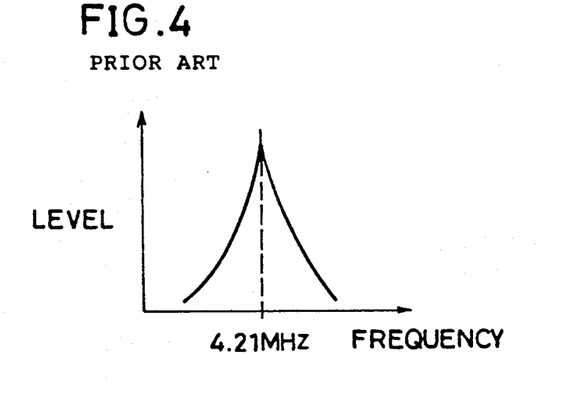
FIG. 4 and FIG. 5 are diagrams showing filter characteristics of a band-pass filter.

In the circuit of FIG. 3, the four-phase logic circuit 15 shifts the oscillating output of the VCO 12 by 90° every 1H. Accordingly, in an output signal of the four-phase logic circuit 15, a sideband having offset of $f_H/4$ to $40f_H$ occurs every 1H, and a sideband corresponding thereto also occurs in an output of the second frequency converting circuit 17. If Q of the band-pass filter 18 is high as shown in FIG. 4, the above described sideband cannot pass through the filter, thereby requiring more time for a phase change of every 1H, which results in distortion of waveform of the chrominance signal near the burst signal. Accordingly, as the band-pass filter 18, usually the one having a wide pass band as shown in FIG. 5 is used.

Figure 5:
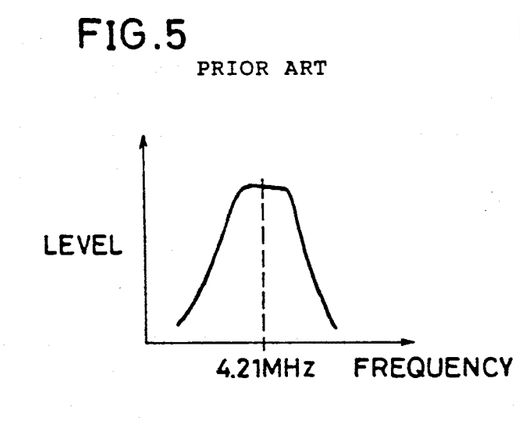
Figure 6:
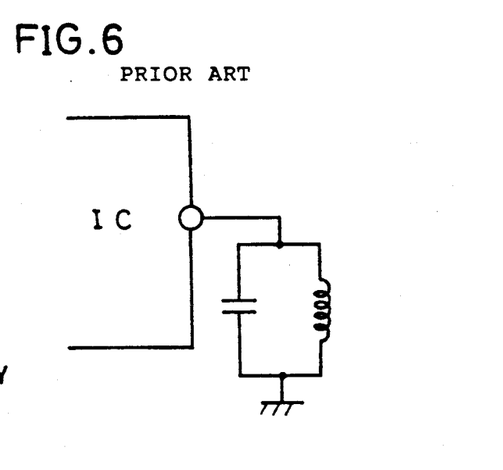
FIG. 6 is a circuit diagram showing an example of a band-pass filter.
Figure 7:
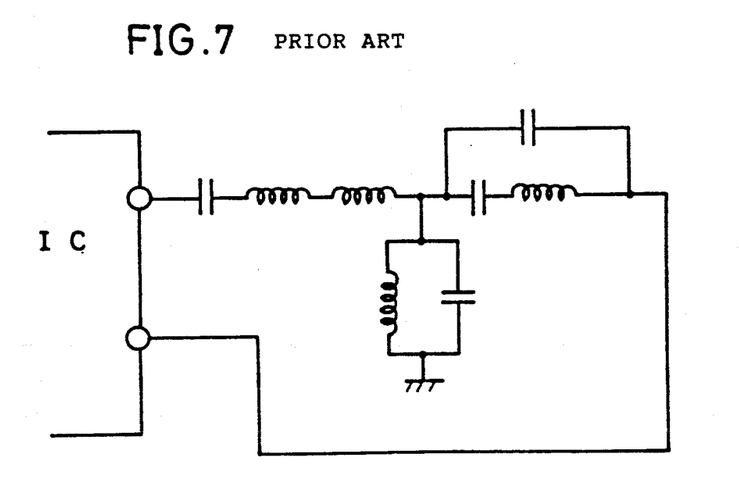
FIG. 7 is a circuit diagram showing another example of a band-pass filter.

A band-pass filter having filter characteristics as shown in FIG. 5 cannot be implemented in a commonly used parallel resonance circuit as shown in FIG. 6 which is formed of a coil and a capacitor, but a structure of the above described band-pass filter becomes complicated such as shown in FIG. 7. Since the band-pass filter shown in FIG. 7 is implemented as an externally provided part of IC as shown, the number of externally provided parts is increased, and two external pins are necessary for every IC. As the foregoing, in the chrominance signal processing circuit as shown in FIG. 3, there were various difficulties in integrating a circuit.

In addition, in the chrominance signal processing circuit in FIG. 3, the multiplying circuit 19, the 90° phase shift circuit 20 and the band-pass filter 21 are required in order to generate a signal of $2f_{SC}$ to be supplied to the comb filter 5 and the luminance signal processing circuit 22, so that the number of the elements is increased. Although the band-pass filter 21 can be implemented in a simple structure shown in FIG. 6, it is implemented as being externally attached to IC, which particularly obstructs integration of a circuit.

In order to resolve the above described problems, the chrominance signal processing circuit is proposed in which an output of the second frequency converting circuit is applied to a band-pass filter having high Q and a phase of the signal passes through the band-pass filter is shifted, which is disclosed in "Development of Color Signal Processor for VHS VTR" by N. Yamamoto et al., in the ITEJ Technical Report, Vol. 12, No. 17, pp.1 through pp.6, issued in May, 1988.

Figure 8:
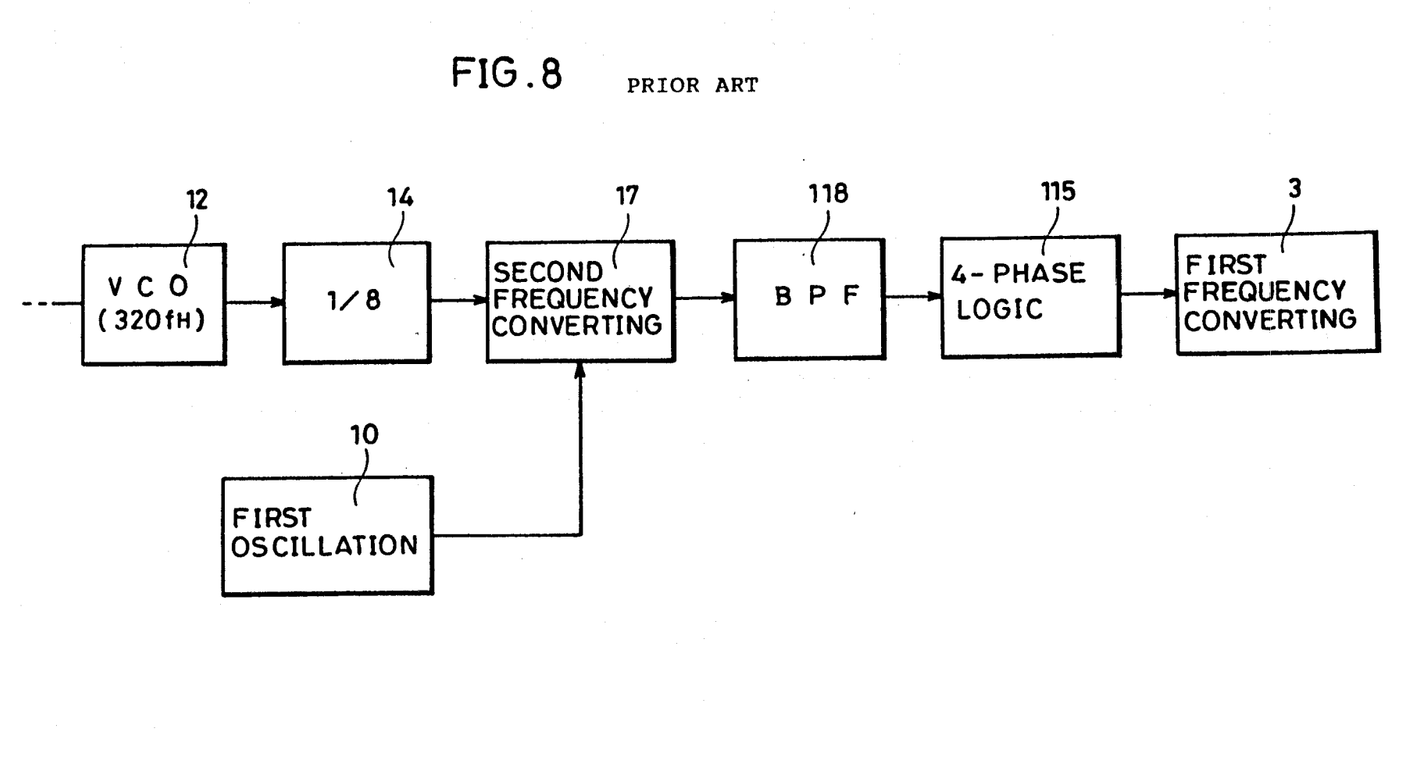
FIG. 8 is a block diagram showing another example of a conventional chrominance signal processing circuit.

FIG. 8 is a block diagram showing main parts of such an improved chrominance signal processing circuit. In FIG. 8, an oscillating output of $320f_H$ of the VCO 12 is frequency-divided into ⅛ in the ⅛ frequency dividing circuit 14 to be a signal of $40f_H$, and applied to the second frequency converting circuit 17. On the other hand, a signal of $f_{SC}$ from the first oscillation circuit 10 is applied to the second frequency converting circuit 17. An output of $f_{SC}+40f_H$ is extracted from an output of $f_{SC}+40f_H$ of the second frequency converting circuit 17 by a band-pass filter 118 having high Q to be applied to a four-phase logic circuit 115. An output of the four-phase logic circuit 115 is supplied to the first frequency converting circuit 3. Since the above described chrominance signal processing circuit is constituted such that a signal of $f_{SC}+40f_H$ not containing a sideband component passes through the band-pass filter 118 having high Q, the number of parts externally attached to IC and external pins of IC can be reduced.

Figure 9:
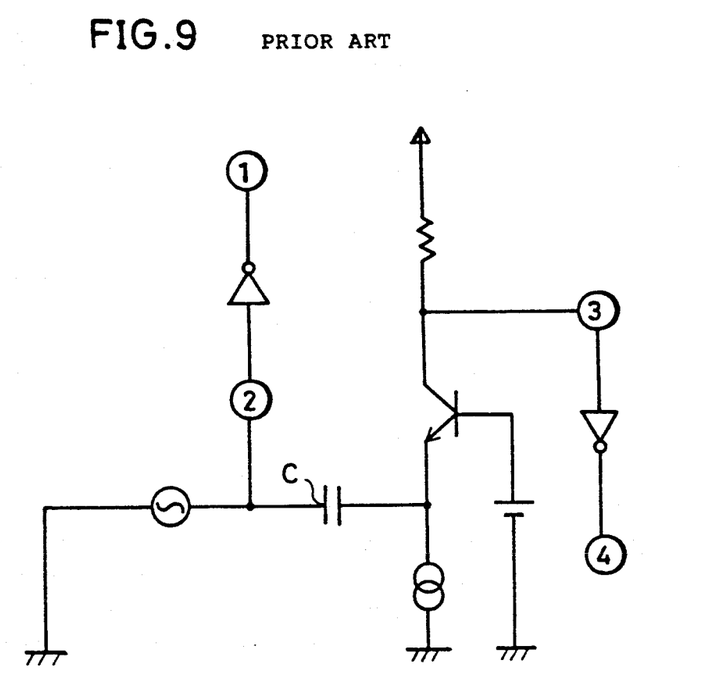
FIG. 9 is a circuit diagram showing an example of the four-phase logic circuit shown in FIG. 8.
Figure 10:
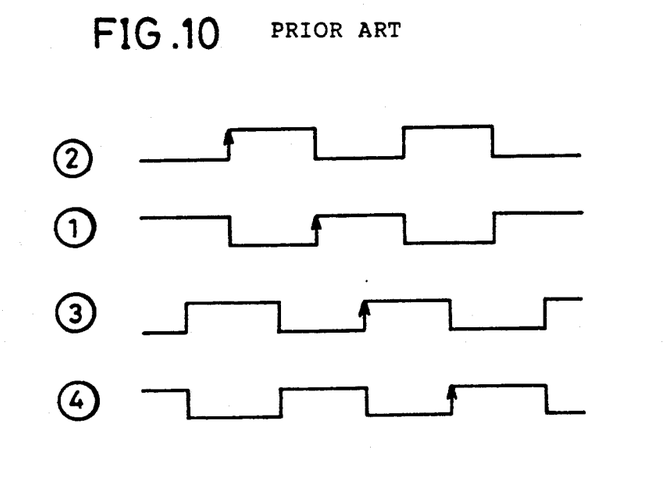
FIG. 10 is a timing chart for explaining an operation of the circuit in FIG. 9.

However, in the circuit shown in FIG. 8, since an input of the four-phase logic circuit 115 is a signal of $f_{SC}+40f_H$, a linear circuit comprising a capacitor and a transistor shown in FIG. 9 should be used in order to generate from the signal of $f_{SC}+40f_H$ four-phase signals out of phase from each other by 90°. Waveforms 1 through 4 of FIG. 10 indicate potentials of the corresponding nodes 1 through 4 in FIG. 9 and constitute outputs of the four-phase logic circuit. The circuit of FIG. 9 performs only a phase shift by 90° but not a frequency-dividing, however, performing a precise phase shift by 90° is difficult due to a capacitor and a transistor as shown, so that a complicated adjustment is necessary to implement a precise phase shift by 90°. In addition, the capacitor C should be provided externally to the IC in order to secure a large capacitance, which is not suitable for integrating the circuit.

SUMMARY OF THE INVENTION

An object of the present invention is to enable a highly accurate converting of a frequency of a chrominance signal.

Another object of the present invention is to generate a highly accurate four-phase signal used for converting a frequency of a chrominance signal.

A further object of the present invention is to simplify a structure of a chrominance signal processing circuit so as to facilitate integration of a circuit.

Briefly stated, the present invention is directed to a chrominance signal processing circuit for converting a frequency of a chrominance signal in a reproduced video signal into a high-frequency, comprising a first frequency converting circuit for receiving a chrominance signal and converting a frequency thereof, a first oscillation circuit for supplying a signal of a first predetermined frequency, a second oscillation circuit whose oscillation is controlled corresponding to a phase difference between a burst signal in a reproduced video signal and an output signal of the first oscillation circuit, for supplying a signal of a second predetermined frequency, a second frequency converting circuit for receiving the output signals of the first and the second oscillation circuits to generate a signal having a frequency of 4n ($f_{SC}\pm40f_H$), a band-pass filter for passing a signal having a frequency of 4n ($f_{SC}+40f_H$) in the output signal of the second frequency converting circuit, and a phase shift circuit for frequency-dividing into ¼ a signal of 4n ($f_{SC}+40f_H$) outputted from the band-pass filter and shifting a phase of the frequency divided signal by 90° every one horizontal period, wherein an output signal of the phase shift circuit is applied to the first frequency converting circuit, and the first frequency converting circuit converts a frequency of the chrominance signal by multiplying the chrominance signal and the output signal of the phase shift circuit "n" is an integer for these frequency calculations.

According to another aspect of the present invention, a chrominance signal processing circuit for converting a frequency of a chrominance signal in a video signal to be recorded into a low-frequency comprises a first frequency converting circuit for receiving a chrominance signal and converting a frequency thereof, a first oscillation circuit oscillating in synchronization with a burst signal in the video signal to be recorded for supplying a signal of a first predetermined frequency, a second oscillation circuit oscillating in synchronization with a horizontal synchronizing signal in the video signal to be recorded for supplying a signal of a second predetermined frequency, a second frequency converting circuit for receiving output signals of the first and the second oscillation circuits to generate a signal having a frequency of 4n ($f_{SC}+40f_H$), a band-pass filter for passing a signal having a frequency of 4n ($f_{SC}+40f_H$) in the output signal of the second frequency converting circuit, a phase shift circuit for frequency-dividing into ¼ a signal of 4n ($f_{SC}+40f_H$) outputted from the band-pass filter and shifting a phase of the frequency-divided signal by 90° every one horizontal period, wherein an output signal of the phase shift circuit is applied to the first frequency converting circuit, and the first frequency converting circuit converts a frequency of the chrominance signal by multiplying the chrominance signal and the output signal of the phase shift circuit.

Therefore, a principal advantage of the present invention is that since oscillating frequencies of the first and the second oscillation circuits are set such that an output of the second frequency converting circuit becomes 4n ($f_{SC}+40f_H$), a four-phase signal used for converting a frequency of the chrominance signal by the first frequency converting circuit can be generated by using a highly precise four-phased logic circuit.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
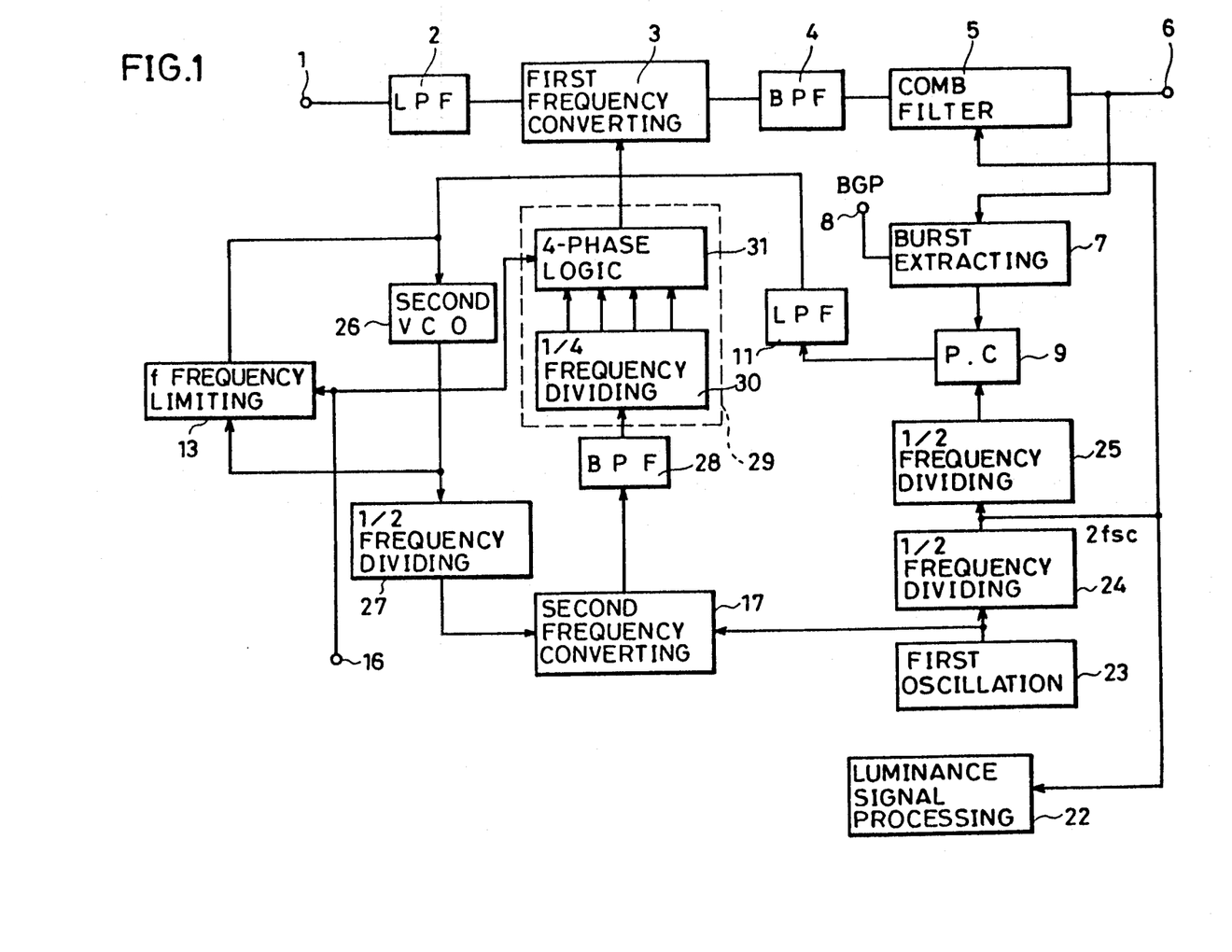
FIG. 1 is a block diagram showing a chrominance signal processing circuit according to a first embodiment of the present invention.

FIG. 1 is a block diagram showing a chrominance signal processing circuit according to a first embodiment of the present invention. The first embodiment, as well as the conventional example shown in FIG. 3, converts a low-frequency converted and recorded chrominance signal into a high-frequency signal in a reproduction system of a video signal in VTR, and at the same time removes a cross-talk, and its structure is the same as that of a circuit in FIG. 3 except the following points.

More specifically, in place of the first oscillation circuit 10 in FIG. 3, a first oscillation circuit 23 having a free running frequency of $4f_{SC}$ is provided, and an oscillation signal of $4f_{SC}$ is applied to one input of a second frequency converting circuit 17, at the same time its frequency is divided into ½ in a first frequency dividing circuit 24 to become a signal of $2f_{SC}$. The signal of $2f_{SC}$ is applied to a comb filter 5 and a luminance signal processing circuit 22, at the same time its frequency is further divided into ½ in a second frequency dividing circuit 25 to be a signal of $f_{SC}$, so that the same is applied to one input of a phase comparator circuit 9.

On the other hand, an output of a second VCO 26 having a free running frequency of $320f_H$ is frequency-divided into ½ by a third frequency dividing circuit 27 to become a signal of $160f_H$, so that the same is applied to the other input of the second frequency converting circuit 17. An output of the second frequency converting circuit 17 is applied to a band pass filter 28 of a structure in FIG. 6 having high Q, and the band pass filter 28 extracts a signal of 4n ($f_{SC}+40f_H$) in the output of the second frequency converting circuit 17 and applies the same to a phase shift circuit 29. When "n"=1, the frequency can be written as 4 ($f_{SC}+40f_H$). The following description assumes that n=1, for exemplary purposes only. The phase shift circuit 29 is formed of a ¼ frequency dividing circuit 30 for generating four frequency-divided output signals which are out of phase by 90° by dividing into ¼ a frequency of an output signal of the band pass filter 28, and a four-phase logic circuit 31 for selecting every 1H any of the four frequency-divided outputs out of phase by 90°.

Figure 11:
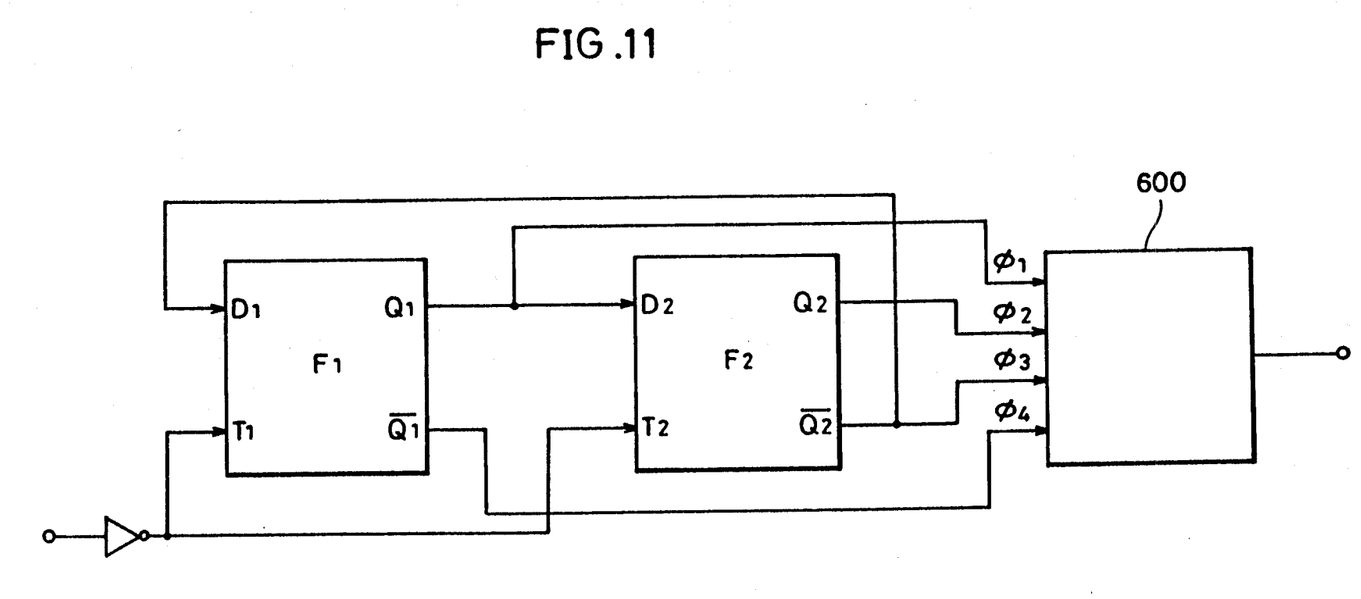
FIG. 11 is a block diagram showing an example of a phase shift circuit used in the first and the second embodiments of the present invention.

As shown in FIG. 11, the phase shift circuit 29 can be formed of two D-type flip-flops F1 and F2, wherein signals $\phi_1$–$\phi_4$ out of phase by 90° outputted from the flip-flops are sequentially selected by a selecting circuit 600 to be outputted.

Since the embodiment of FIG. 1 is directed to a case wherein a video signal of NTSC system is processed, a free running frequency of the second VCO 26 is set to $320f_H$, however, if it is directed to a case wherein a video signal of PAL system is processed, the free running frequency of the second VCO 26 can be set to $321f_H$.

Now, an operation of the first embodiment shown in FIG. 1 will be described. In FIG. 1, as in FIG. 3, a chrominance signal of $f_{SC}$ generated from the comb filter 5 is applied to the burst extracting circuit 7 and only a burst signal is extracted to be applied to one input of the phase comparator circuit 9. On the other hand, a signal of $4f_{SC}$ from the first oscillation circuit 23 is frequency-divided into ¼ in the first and the second frequency dividing circuits 24 and 25 to be a signal of $f_{SC}$, then applied to the other input of the phase comparator circuit 9. As a result, in the phase comparator circuit 9, phases are intermittently compared and its error output is applied through the low pass filter 11 to the second VCO 26. Then, an oscillating output of $320f_H$ of the second VCO 26 is frequency-divided into ½ by the third frequency dividing circuit 27 to be an oscillating output of $160f_H$, whereby the same is applied to one input of the second frequency converting circuit 17.

On the other hand, a signal of $4f_{SC}$ from the first oscillation circuit 23 is directly applied to the other input of the second frequency converting circuit 17, and both signals are multiplied in the second frequency converting circuit 17. As a result, a signal of 4 ($f_{SC}+40f_H$) is applied from the second frequency converting circuit 17 to the band pass filter 28. As is obvious from FIG. 1, since the signal of 4 ($f_{SC}+40 f_H$) has not been subjected to a phase shift of every 1H yet, it does not contain a side band component having an offset of $f_H/4$. Therefore, as the band pass filter 28, the one formed as in FIG. 6 and having filter characteristics of FIG. 4 can be used.

The signal of 4 ($f_{SC}+40 f_H$)≈4×4.21 MHz which has passed through the band pass filter 28 is frequency-divided into ¼ in the ¼ frequency dividing circuit 30 to be a signal of $f_{SC}+40f_H$ and four signals of ($f_{SC}+40f_H$) which are further out of phase by 90° are supplied to the four-phase logic circuit 31. Thus, a signal of ($f_{SC}+40 f_H$) is generated at an output terminal of the four-phase logic circuit 31 every 1H with its phase shifted by 90° and supplied to the first frequency converting circuit 3. An operation in a following stage of the first frequency converting circuit 3 is the same as that of the prior art in FIG. 3.

On the other hand, since a signal of $2f_{SC}$ which is obtained by dividing a frequency of a signal of $4f_{SC}$ into ½ is obtained at an output terminal of the first frequency dividing circuit 24 as described above, the signal can be used for an operation of an delay line (not shown) of the comb filter 5 and a noise removing circuit (not shown) of the luminance signal processing circuit 22.

As the foregoing, according to the first embodiment of the present invention, since a signal of 4($f_{SC}+40f_H$) is obtained as an output of the second frequency converting circuit 17, a four-phase signal can be easily generated by using a highly precise phase shift circuit as shown in FIG. 11, and complication of a circuit structure can be prevented.

Figure 2:
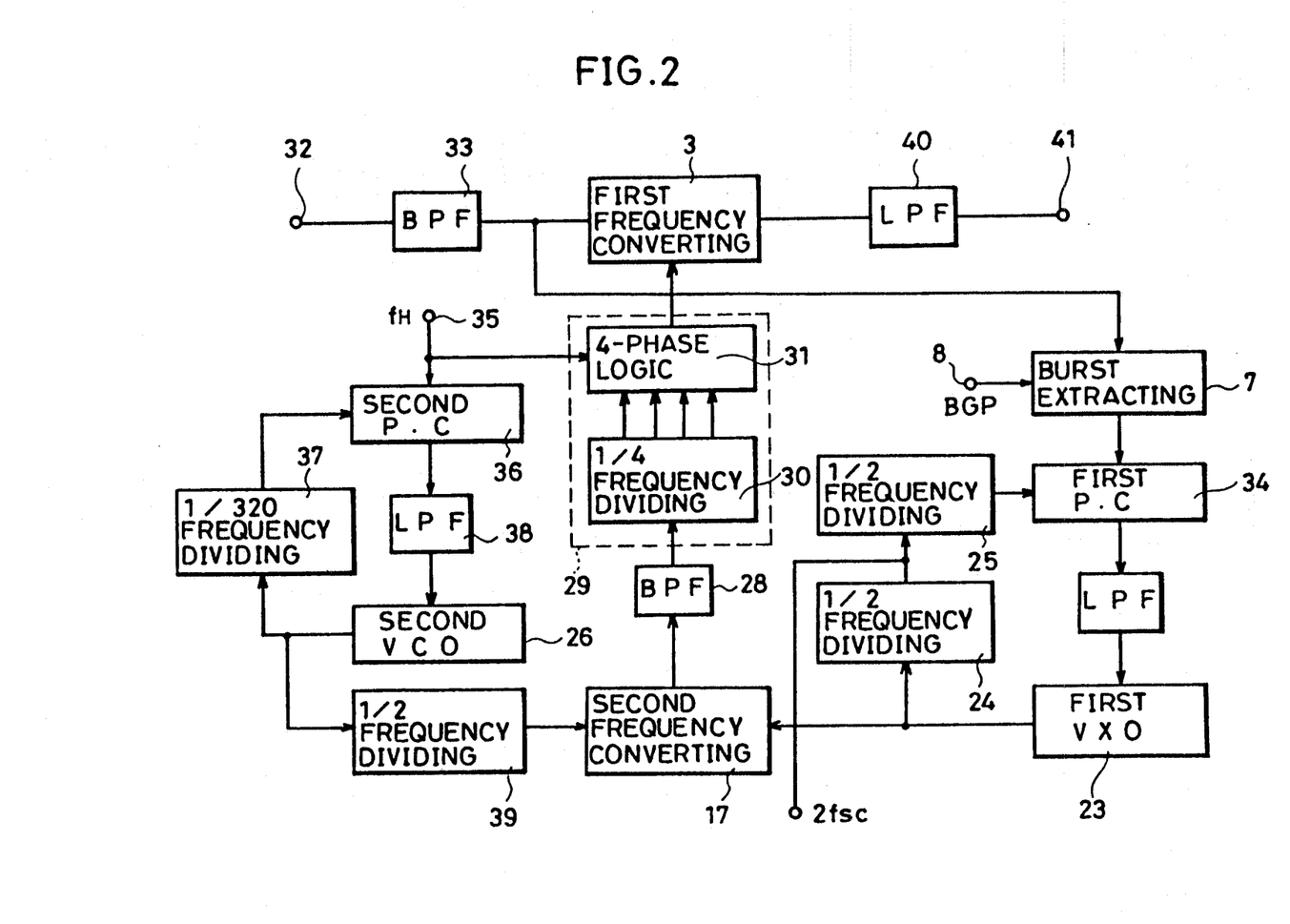
FIG. 2 is a block diagram showing a chrominance signal processing circuit according to a second embodiment of the present invention.

FIG. 2 is a block diagram showing a chrominance signal processing circuit according to a second embodiment of the present invention. In the second embodiment, a frequency of a chrominance signal to be recorded is converted into a low-frequency in a recording system of a video signal in VTR.

More specifically, a video signal to be recorded is inputted from a tuner and the like (not shown) to an input terminal 32. Only a chrominance signal of 3.58 MHz in the inputted video signal passes through a band pass filter 33 to be inputted to a first frequency converting circuit 3 and applied to a burst extracting circuit 7. The burst extracting circuit 7 extracts a burst signal from the chrominance signal in response to a burst gate pulse supplied from 7 terminal 8 for applying the same to one input of a phase comparator circuit 34. On the other hand, an oscillating output of $4f_{SC}$ of a first voltage controlled crystal oscillation circuit (VXO) is frequency-divided by first and second frequency dividing circuits 24 and 25 to be applied to the other input of the phase comparator circuit 34. Then, since the first VXO 23 is controlled by an error output of the phase comparator circuit 34, the VXO 23 oscillates in synchronization with the burst signal and applies an oscillating output signal of $4f_{SC}$ to a second frequency converting circuit 17.

On the other hand, a horizontal synchronizing signal separated from the video signal is inputted from a terminal 35 and applied to one input of a phase comparator circuit 36. In addition, an oscillating output of a second VCO 26 oscillated at $320f_H$ is frequency-divided into 1/320 by a 1/320 frequency dividing circuit 37 to be a signal of $f_H$ and the same applied to the other input of the phase comparator circuit 36. Then, in the phase comparator circuit 36, phases of the both signals are compared and its error output is applied to the second VCO 26 through a low pass filter 38. Therefore, the second VCO 26 oscillates in synchronization with the horizontal synchronizing signal. An oscillation output of the VCO 26 is frequency-divided into ½ in a third frequency dividing circuit 39 to be a signal of $160f_H$ and the same is applied to one input of the second frequency converting circuit 17.

As a result, a signal of 4 ($f_{SC}+40f_H$) is generated at an output terminal of the second frequency circuit 17, so that only a signal of 4 ($f_{SC}+40f_H$) is extracted by the band pass filter 28 and applied to a phase shift circuit 29. The phase shift circuit 29 operates as the phase shift circuit 29 in FIG. 1. The signal of $f_{SC}$ and the signal of ($f_{SC}+40f_H$) are multiplied in the first frequency converting circuit so that a signal of ($f_{SC}+40f_H$)+$f_{SC}$ which is a component of the sum and the difference is applied to a low pass filter 40. Then, only the signal of $40f_H$ is extracted to be supplied to an output terminal 41. Also in this case, a signal of $2f_{SC}$ can be obtained from an output terminal of the first frequency dividing circuit 24.

As the foregoing, according to the second embodiment of the present invention, since a signal of 4 ($f_{SC}+40f_H$) is obtained at an output of the second frequency converting circuit 17, a four-phase signal can be generated by using a highly precise phase shift circuit as shown in FIG. 11.

In addition, according to the above described first and second embodiments, since a signal of $2f_{SC}$ can be generated only by frequency-dividing an oscillating output of $4f_{SC}$ of the first VCO, a multiplying circuit, a 90° phase shift circuit and a band pass filter which are required in the prior art shown in FIG. 3 are unnecessary, so that the number of the circuit elements and externally provided parts of the IC is further decreased.

In addition, the band-pass filter 28 thus formed as in FIG. 6 can be contained in IC if it can be implemented as an active filter.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A chrominance signal processing circuit for converting a frequency of a chrominance signal in a reproduced video signal into a high-frequency, comprising:
   first frequency converting means for receiving said chrominance signal and converting a frequency of the received chrominance signal,
   burst extracting means for extracting a burst signal from said reproduced video signal,
   first oscillating means for generating an output signal of a first predetermined frequency,
   phase comparator means for generating a signal representing a phase difference between said burst signal and said output signal of said first oscillating means,
   second oscillating means, whose oscillation frequency is controlled corresponding to said phase difference, for supplying a signal of a second predetermined frequency,
   second frequency converting means for receiving output signals of said first and second oscillating means and for generating a signal having a frequency of 4n ($f_{SC}\pm40f_H$), wherein n is an integer, $f_{SC}$ is a chrominance subcarrier frequency, and $F_H$ is a horizontal frequency,
   filter means for passing a signal having a frequency of 4n ($f_{SC}\pm40f_H$) in the output signal of said second frequency converting means, and phase shifting means for dividing the frequency of a signal of 4n ($f_{SC}+40f_H$) outputted from said filter means by four and shifting the phase of the frequency-divided signal by 90° for each horizontal period, said phase shifting means having an output signal therefrom, said output signal of said phase shifting means being applied to said first frequency converting means, and said first frequency converting means converting a frequency of said chrominance signal by multiplying said chrominance signal by output signal of said phase shifting means.

2. A chrominance signal processing circuit according to claim 1, wherein
said secondary frequency converting means generates a signal having a frequency of 4n ($f_{SC}\pm40f_H$), and said filter means passes a signal having a frequency of 4n ($f_{SC}+40f_H$), wherein n=1.

3. A chrominance signal processing circuit according to claim 2, wherein
said first predetermined frequency is $4f_{SC}$, and said second predetermined frequency is $160f_H$.

4. A chrominance signal processing circuit according to claim 1, wherein
said phase shifting means comprises
frequency dividing means (30) for dividing the frequency of the output signal of said filter means by four to generate four frequency-divided signals which are out of phase by 90° from each other, and
four-phase logic means (31) for sequentially switching said four frequency-divided output signals every horizontal period to an output signal.

5. A chrominance signal processing circuit according to claim 4, further comprising noise removing means (5) driven by an output signal of said first oscillating means for removing a noise in a chrominance signal outputted from said first frequency converting means.

6. A chrominance signal processing circuit for converting a frequency of a chrominance signal in a video signal to be recorded into a low-frequency, comprising:
first frequency converting means for receiving said chrominance signal and converting a frequency of the received chrominance signal,
burst extracting means for extracting a burst signal from said video signal,
first oscillating means oscillating in synchronization with said burst signal, generating an output signal of a first predetermined frequency,
second oscillating means oscillating in synchronization with a horizontal synchronizing signal in said video signal to be recorded for generating an output signal of a second predetermined frequency,
second frequency converting means for receiving output signals of said first and second oscillating means for generating a signal having a frequency of 4n ($f_{SC}\pm40f_H$),
filter means for passing a signal having a frequency of 4n ($f_{SC}+40f_H$) in the output signal of said second frequency converting means, and
phase shifting means for dividing the frequency of a signal of 4n ($f_{SC}+40f_H$) outputted from said filter means and shifting the phase of the frequency-divided signal by 90° every one horizontal period, said phase shifting means having an output signal therefrom,
said output signal of said phase shifting means being applied to said first frequency converting means, and said first frequency converting means converting a frequency of said chrominance signal by multiplying said chrominance signal and the output signal of said phase shifting means.

7. A chrominance signal processing circuit according to claim 6, wherein
said second frequency converting means generates a signal having a frequency 4n ($f_{SC}+40f_H$), and said filter means passes a signal having a frequency of 4n ($f_{SC}+40f_H$), wherein n=1.

8. A chrominance signal processing circuit according to claim 6, wherein
said phase shifting means comprises:
frequency dividing means for dividing the frequency of the output signal of said filer means to generate four frequency-divided signals which are out of phase by 90° from each other, and
four-phase logic means for sequentially switching said four frequency-divided output signals every horizontal period to an output signal.

9. A video tape recorder having a function of processing a chrominance signal by which a frequency of the chrominance signal in a reproduced video signal is converted into a high-frequency, comprising:
first frequency converting means for receiving said chrominance signal and converting a frequency of the received chrominance signal,
burst extracting means for extracting a burst signal from said reproduced video signal,
first oscillating means for generating an output signal of a first predetermined frequency,
phase comparator means for generating a signal representing a phase difference between said burst signal and said output signal of said first oscillating means,
second oscillating means, whose oscillation frequency is controlled corresponding to said phase difference, for supplying a signal of a second predetermined frequency,
second frequency converting means for receiving output signals of said first and second oscillating means and for generating a signal having a frequency of 4n ($f_{SC}\pm40f_H$), wherein n is an integer, $f_{SC}$ is a chrominance subcarrier frequency, and $F_H$ is a horizontal frequency,
filter means for passing a signal having a frequency of 4n ($f_{SC}+40f_H$) in the output signal of said second frequency converting means, and
phase shifting means for dividing the frequency of a signal of 4n ($f_{SC}+40f_H$) outputted from said filter means by four and shifting the phase of the frequency-divided signal by 90° for each horizontal period, said phase shifting means having an output signal therefrom, said output signal of said phase shifting means being applied to said first frequency converting means, and said first frequency converting means converting a frequency of said chrominance signal by multiplying said chrominance signal by output signal of said phase shifting means.

10. A video tape recorder having a function of processing a chrominance signal by which a frequency of a chrominance signal in a video signal to be recorded is converted into a low-frequency, comprising:
first frequency converting means for receiving said chrominance signal and converting a frequency of the received chrominance signal,
burst extracting means for extracting a burst signal from said video signal, first oscillating means oscillating in synchronization with said burst signal, generating an output signal of a first predetermined frequency, second oscillating means oscillating in synchronization with a horizontal synchronizing signal in said video signal to be recorded for generating an output signal of a second predetermined frequency, second frequency converting means for receiving output signals of said first and second oscillating means for generating a signal having a frequency of $4n\ (f_{SC} \pm 40f_H)$, filter means for passing a signal having a frequency of $4n\ (f_{SC} + 40f_H)$ in the output signal of said second frequency converting means, and phase shifting means for dividing the frequency of a signal of $4n\ (f_{SC} + 40f_H)$ outputted from said filter means and shifting the phase of the frequency-divided signal by 90° every one horizontal period, said phase shifting means having an output signal therefrom, said output signal of said phase shifting means being applied to said first frequency converting means, and said first frequency converting means converting a frequency of said chrominance signal by multiplying said chrominance signal and the output signal of said phase shifting means.

* * * * *